Patented Mar. 15, 1932

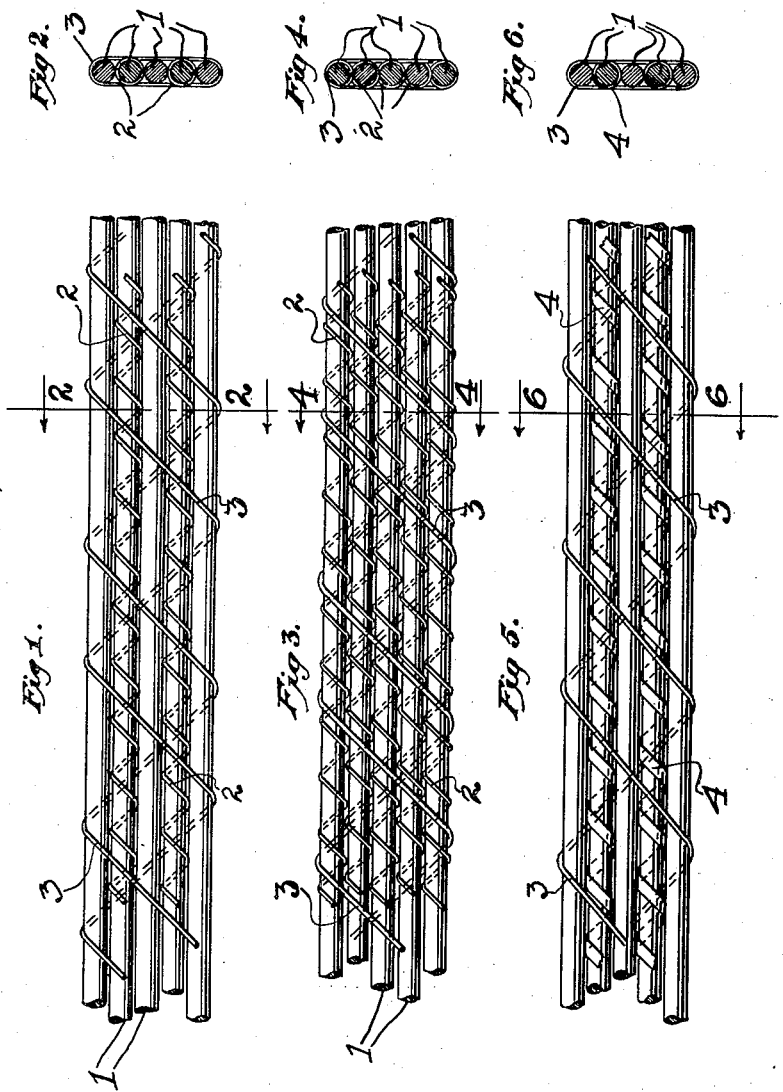

1,849,781

UNITED STATES PATENT OFFICE

CLARENCE S. ARMS, OF WORCESTER, MASSACHUSETTS, ASSIGNOR TO THOMPSON WIRE COMPANY, OF BOSTON, MASSACHUSETTS, A CORPORATION OF MASSACHUSETTS

REENFORCING ELEMENT FOR BEADS OF RUBBER TIRES

Application filed February 5, 1931. Serial No. 513,510.

The present invention relates to the reenforcing elements, or grommets, that are customarily employed in the manufacture of rubber tires for the purpose of strengthening the beads of the tires. The object of the invention is to provide a reenforcing element of the above indicated character which will exhibit a high tensile strength, a minimum of elongation under strain, and a maximum ability to hold its place in position when incorporated in the tire bead. Furthermore, the construction of the reenforcing element of the present invention is such that it may be manufactured at a high rate of production, at low cost.

In the previous manufacture of such reenforcing elements it has been customary to form them by providing a plurality of parallel core wires formed into a flat member either by braiding the same together, or binding them together by means of relatively fine wire threaded over and under the parallel core wires, or wrapped around the core wires. In practice, however, it has been found that reenforcing elements formed in the above described manner possess certain disadvantages arising from features inherent in their construction. For example, when the core wires are braided into a flat element there is always the possibility of the finished element elongating under strain after incorporation in the tire bead; furthermore, friction is developed at the points of intersection of the braided wires under operating conditions, thereby producing heat and eventual breaking of the wires in the bead. The same objections are exhibited by reenforcing elements made of core wires held together by relatively fine wire braided over and under the core wires, and it is obvious that the manufacturing cost of braided reenforcing elements is high, due to the necessarily slow rate of production by a circular or reciprocating loom.

With respect to the last-named manner of construction noted above, wherein the parallel core wires are merely held together by being wrapped with fine wire, the absence of any spacing or separation of the parallel core wires prevents the rubber from entering between the wires in the finished bead, thereby very seriously reducing the effectiveness of such elements in finished tires.

As previously pointed out, the object of the present invention is to provide reenforcing elements for tire beads so formed as to exhibit not only a high tensile strength and a minimum of elongation under strain, but also to provide for the maximum degree of adhesion with the material of the tire beads. The above and other advantageous features of the invention will hereinafter more fully appear from the following description with reference to the accompanying drawings, in which:—

Fig. 1 is a plan view of a portion of a reenforcing element embodying the invention, Fig. 2 is a sectional view along the line 2—2 of Fig. 1 looking in the direction of the arrows, Fig. 3 is a view similar to Fig. 1 showing a modification in the formation of the reenforcing element, Fig. 4 is a sectional view along the line 4—4 of Fig. 3 looking in the direction of the arrows, Fig. 5 is a view similar to Fig. 1 showing another modification of the invention, and Fig. 6 is a sectional view along the line 6—6 of Fig. 5.

Like reference characters refer to like parts in the different figures.

Referring first to Fig. 1, the reenforcing element comprises a plurality of core wires 1 of high-tensile strength extending in parallel relation so as to provide a relatively flat member, as viewed in section in Fig. 2. One or more of the core wires 1 are wrapped with a separating wire 2 with the convolutions thereof in spaced relation, each separating wire 2 being of relatively small diameter as compared to the core wires 1. When one or more core wires 1 are thus wrapped with the separating wires 2 and all of the core wires are assembled into a flat element, the individual parallel core wires 1 are uniformly separated from each other along the entire length of the element by spaces approximating the diameter of the separating wires 2. After the core wires are assembled as described above, they are secured together to form the finished reenforcing element by being wrapped with one or more binding wires 3 laid with the convolutions thereof extending between the convolutions of the separating wires 2. The binding wires 3 will serve to hold the core wires 1 together to form a flat reenforcing member with the core wires 1 uniformly spaced from each other.

According to the present invention, the particular construction of reenforcing elements formed as described above may be varied within a considerable range to suit the different requirements of tire manufacturers. Thus, in producing reenforcing elements for a tire bead requiring five core wires, only every other core wire may be wrapped with spacing wire 2, as shown in Fig. 1, or it may be desirable to wrap each core wire 1, as shown in Fig. 3. In either form of the reenforcing element, the uniformity of the spacing of the core wires is maintained, and the assembled core wires are held together by binding wires 3 having their convolutions between the spacing wires 2.

In any form of reenforcing element constructed in accordance with my invention, the distance between the parallel core wires in the assembled element is uniformly and accurately determined by the diameter of the spacing wires 2, and obviously both the diameter and cross-section of the spacing wires 2 may be varied to meet the particular requirements of tire manufacturers. Thus in Fig. 5, one or more of the core wires 1 are shown as being wrapped with flat spacing wires or strips 4, which strips 4 have the same function as the spacing wires 2 of Fig. 1. Obviously, other variations of the size and cross-sectional form of the spacing wires may be made without departing from the invention.

When reenforcing elements constructed in the manner shown in Figs. 1, 3 or 5 are incorporated in the beads of tires, the uniform spacing of the core wire makes it possible for the rubber to pass between the core wires so that the latter are completely surrounded by the tire material of the bead. Furthermore, the spaced convolutions of both the separating wires 2 and the binding wires 3 provide a multiplicity of projecting surfaces extending along the reenforcing element, thereby greatly increasing the area of contact between the element and the rubber and substantially eliminating any possibility of the reenforcing elements shifting circumferentially within the tire beads. From the foregoing then, it is apparent that by the present invention there is provided an improved construction of reenforcing elements for tire beads whereby a maximum degree of strength and holding quality for the elements is obtained.

I claim:

1. A flat reenforcing element for the beads of automobile tires, consisting of a plurality of round high-tensile strength core wires formed into a flat member and held in parallel relationship by a binding wire, one or more of said core wires being wrapped with a spacing wire or strip the convolutions of which are adapted to maintain adjacent core wires in spaced relation.

2. A flat reenforcing element for the beads of automobile tires, consisting of a plurality of round high-tensile strength core wires formed into a flat member and held in parallel relationship by a binding wire, one or more of said core wires being wrapped with spacing wire, the convolutions of which are interposed between the convolutions of the binding wire.

3. A flat reenforcing element for the beads of automobile tires, consisting of a plurality of round high-tensile strength core wires formed into a flat member and held in parallel relationship by a binding wire, one or more of said core wires being wrapped with a flat spacing strip, the convolutions of which are adapted to maintain adjacent core wires in spaced relation.

CLARENCE S. ARMS.